INVENTORS.
ROBERT G. STERN
THOMAS COURTENAY WAKEFIELD
BY
their ATTORNEY.

_United States Patent Office_

2,784,501
Patented Mar. 12, 1957

2,784,501

APPARATUS FOR SIMULATING FLIGHT CONDITIONS OF HIGH SPEED AIRCRAFT

Robert G. Stern, Caldwell, and Thomas Courtenay Wakefield, Denville, N. J., assignors to Curtiss-Wright Corporation, a corporation of Delaware Application June 2, 1952, Serial No. 291,253

19 Claims. (Cl. 35—12)

This invention relates to flight simulating apparatus, particularly to such apparatus useful in the ground training of aircraft personnel for operating high speed type aircraft.

The operation of conventional type aircraft, i. e. piston-driven propeller aircraft, is in general fairly predictable within the speed range of the aircraft. It is therefore sufficient for flight simulators for this type to represent various flight conditions such as angle of attack, drag, control loading, etc. as primarily affected by the represented airspeed of the airplane. However, when the aircraft speed is in the high sub-sonic or transonic range, i. e. in the region of the velocity of sound, the conventional flight trainer is no longer of practical use since various flight conditions are now materially affected according to the relationship of the plane's airspeed to the speed of sound at the prevailing ambient air temperature. This relationship is known as "Mach number" and may be expressed:

$$M = V_T/a \qquad \text{Equation 1}$$

where $M$ = Mach number
$V_T$ = true airspeed of aircraft
$a$ = speed of sound at a given temperature, $t$ Accordingly, the speed of sound may be expressed as a function of air temperature, $a = f(t)$, so that $M = V_T/f(t)$, or $V_T = M.f(t)$.

An example of the effect of variation in Mach number on a basic flight condition is the pronounced change in the angle of attack required for constant lift as the Mach number passes through a critical range. Assuming a specific aircraft design by way of example, as the Mach number increases above approximately 0.6 the coefficient of lift increases markedly, then flattens off at approximately Mach number 0.8 and markedly decreases as Mach number approaches 1.0. In other words, the pilot of a jet type aircraft for example must be trained and aware of Mach number effect in order to control, among other things, flight on a level course at high sub-sonic or transonic speeds. Another example is the so-called "sonic wall," i. e. the effect of Mach number on the "drag coefficient." As is well known, the drag coefficient increases very sharply when Mach number reaches a critical value. Phenomenon of the above-described nature is not taken into account in conventional flight trainers so that such equipment is inadequate for the training of jet type aircraft pilots.

A principal object therefore of this invention is to provide improved flight simulating apparatus for the ground training of personnel of jet or high speed aircraft and for representing the flight conditions of this type of aircraft that is efficient and realistic, particularly as to the effect of Mach number on the basic flight conditions simulated.

A further object of the invention is to provide an improved flight computing system including an electromechanical servo mechanism representing Mach number for modifying the operation of other interrelated servo mechanisms representing other flight conditions so as to simulate the effect of Mach number on the operation of high speed aircraft in the sonic range.

A further object of the invention is to provide an improved flight computing system including an electromechanical servo mechanism for modifying the operation of aerodynamic force computing means for simulating the control loading of high speed aircraft.

The invention will be more fully set forth in the following description referring to the accompanying drawings, and the features of novelty will be pointed out with particularity in the claims annexed to and forming a part of this specification.

Referring to the drawings.

The flight computer system is of the electrical type involving a plurality of interconnected and interacting servo systems that are responsive to input voltages derived according to operation of the simulated controls and operates generally in the manner of the flight computing system disclosed and claimed in Patent No. 2,731,737 granted January 24, 1956, to Robert G. Stern for "Aircraft Training Apparatus for Simulating Landing and Related Maneuvers." The simulated flight indicating instruments are in turn responsive to the operation respectively of certain of the aforesaid servo systems of the computer so as to represent various flight conditions produced by the student's manipulation of the controls. An analysis and general disclosure of this type of flight computing system is contained in a co-pending application, Serial No. 429,314, filed May 12, 1954, which is a continuation of S. N. 777,414, filed October 2, 1947, by R. C. Dehmel for "Flight Computing System and Apparatus," now abandoned.

The functioning of the flight computing system in general will be briefly described since a complete understanding of the present invention can be gained from a description of the essential functions of the various flight computer servo systems. It is unnecessary for the purposes of this invention to analyze in detail all the indicated servo input and output voltages representing aerodynamic control quantities other than to state that they represent velocities, forces and factors of basic flight equations.

A reference alternating current voltage source is used for energizing the complete system and the various derived and control voltages are obtained from this source, it being understood that the positive and negative indications represent instantaneous polarity with respect to the reference source.

Figure 1:
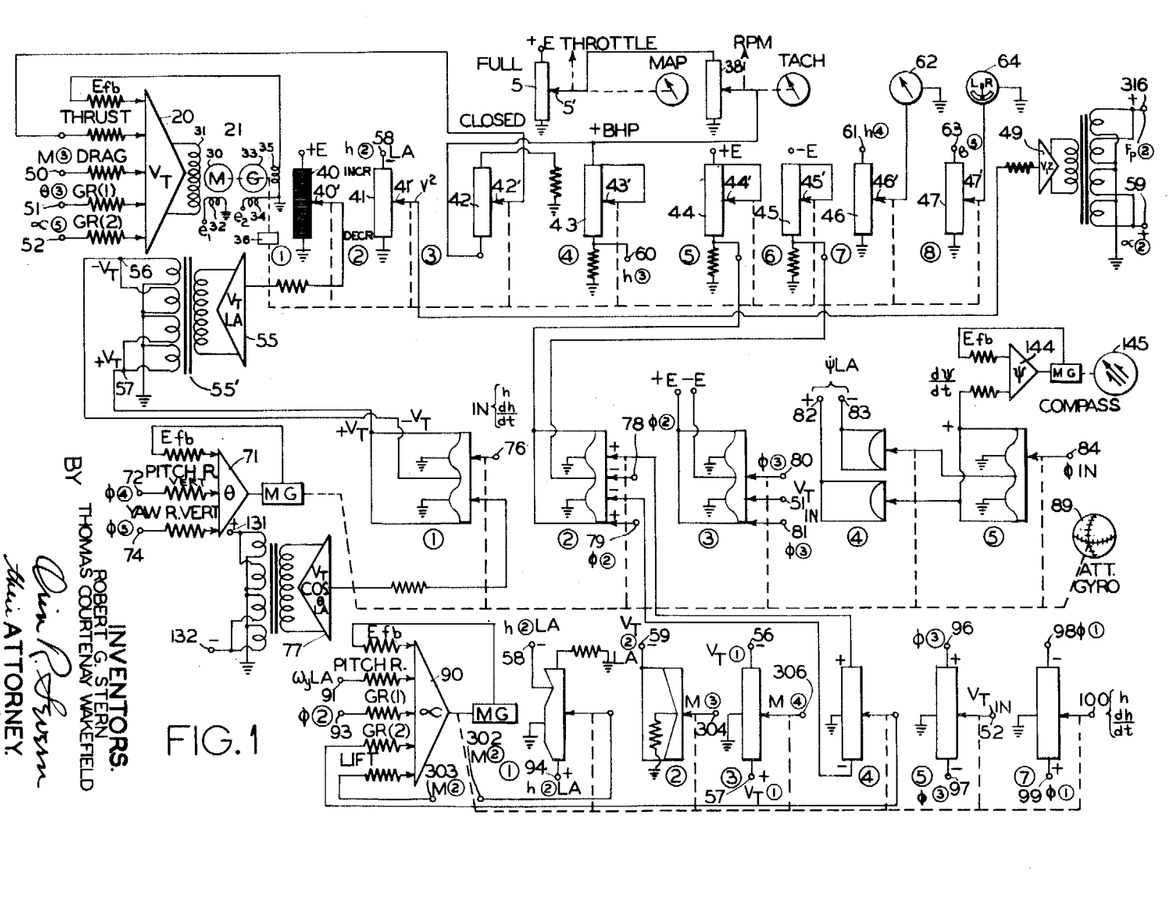
Fig. 1 is a partly diagrammatic and schematic illustration of certain components of an electrical servo potentiometer computing system embodying the present invention including the true airspeed, pitch and angle-of-attack servo systems.
Figure 4:
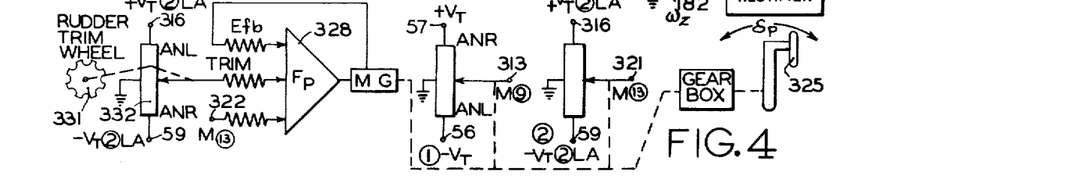
Figs. 4, 5 and 6 illustrate respectively the simulated rudder, elevator and aileron controls, the associated trim controls and control loading servo and potentiometer units respectively.
Figure 5:
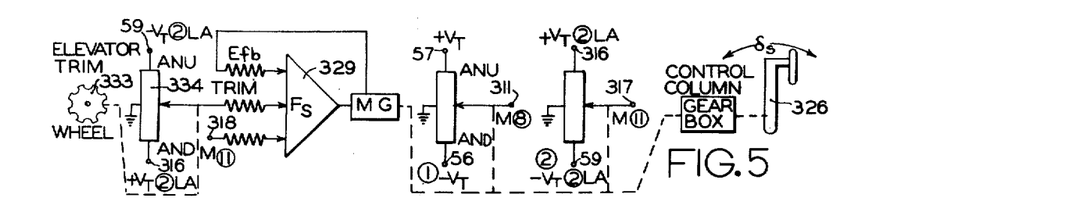
Figure 6:
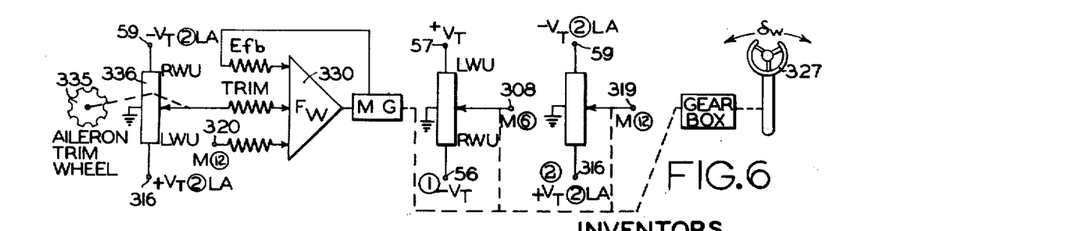

For example, referring to Figs. 4, 5 and 6 various flight control potentiometers responsive to rudder, elevator and aileron controls operable by the student pilot are energized by voltages representing certain functions of true airspeed ($V_T$) obtained from the airspeed servo systems, Fig. 1, and the derived voltages in turn control the basic aircraft axes servos. The airspeed servo system is controlled by a number of factors, mainly "thrust," "drag" and "gravity" as represented by voltages. In the present disclosure, "thrust" is represented as derived from a conventional aircraft engine-propeller combination for simplicity of disclosure but it will be understood that the source of the simulated thrust is not determining and that simulated jet engine thrust is contemplated in practicing the invention.

Referring now to Fig. 1, a throttle potentiometer 5, is energized as indicated at its upper terminal by a constant A. C. voltage +E and is grounded at its lower terminal. The derived voltage from slider contact 5' as the throttle is adjusted by the student is modified according to engine and airspeed as presently described to represent thrust (T$h$) for a constant R. P. M. according to the relationship T$h$=H. P./v. This thrust voltage, together with other voltages representing drag, etc. is fed to the airspeed servo which in turn produces the airspeed function voltages.

The aileron, elevator and rudder control potentiometers, Figs. 4 to 6, are each energized at their opposite terminals by oppositely phased voltages representing functions of V$_T$. Also each of these potentiometers is provided with a grounded center tap for simulating positive and negative angular velocities about the convention aircraft axes, Fig. 7, with respect to a normal level flight position. The various derived velocity voltages from the control potentiometers are directed to the computing system from which control voltages are in turn obtained for operating the flight indicating instruments of the trainer above referred to.

The flight computing and integrating apparatus as shown by Figs. 1 to 6 will now be described. This apparatus as shown comprises essentially nine motor servo potentiometer units and three summing or line amplifier units, each representing a flight condition such as airspeed, angle of attack, Mach number, rate of pitch, etc. as indicated, inter-connected in an interacting electro-mechanical network so as to operate according to certain flight principles for simultaneously and continuously computing the respective flight condition. For the purpose of clarity the interrelating circuits of the respective servo units illustrated are simplified to an extent sufficient to teach the invention.

Figure 7:
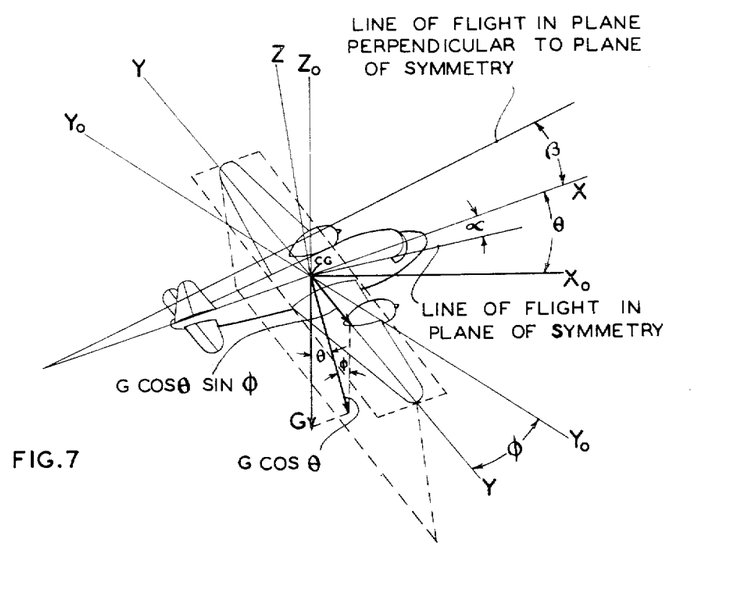
Fig. 7 is a vector diagram illustrating aircraft reference axes, flight angles and resolution of force vectors.

Primarily, in the operation of the present system voltages are derived in accordance with the student's operation of the above-described simulated aircraft controls proportional to the various velocities and forces that produce motion or acceleration with respect to three reference axes according to fundamental aerodynamic principles. The three reference axes referring to Fig. 7 are (1) the longitudinal or X axis of the aircraft, (2) the Y axis along the plane of the wings perpendicular to the longitudinal axis and (3) the Z axis mutually perpendicular to the other two, all axes intersecting at the center of gravity (C. G.) of the aircraft.

The fixed or earthbound axes are shown at X$_0$, Y$_0$ and Z$_0$ respectively, the X$_0$ axis also representing the North reference direction in this case. As shown, the aircraft is nosed upward by a pitch angle $\theta$ and is rolled to the right by a roll angle $\phi$. The azimuth angle $\psi$ which is the angle measured in a horizontal plane between the North reference direction X$_0$ and the airplane X axis, is not shown since it is zero in the present instance. Fig. 7 also illustrates the resolution of the weight or gravity (G) vector for a combined pitch and roll attitude. Two other angles that are used in this analysis are the angle of attack $\alpha$ and the angle of sideslip B. The angle of attack is the angle, measured in the airplane's plane of symmetry (X-Z plane) between the fuselage reference line of the airplane or X axis and the flight path. The angle of sideslip is the angle measured in a plane perpendicular to the airplane's plane of symmetry (parallel to X-Y) plane between the fuselage reference line (X axis) and the flight path. These two angles are known as the aerodynamic angles. Aerodynamic forces and angular velocities result from the variation of either of the angles.

Translation and rotation with respect to the aircraft axes and with respect to the fixed axes mutually perpendicular and parallel to the horizon are represented by the servo and amplifier systems. In one of these systems forces are computed to produce rate of yaw, and in a third angular velocities are computed to produce rate of pitch. Additional servos are provided to represent angle of attack and sideslip respectively, the angle of attack servo integrating angular velocities about the Y axis for the purpose of computing aerodynamic quantities of lift, drag, and pitching velocity, and the sideslip servo computing the angle between the plane of symmetry of the aircraft and the flight path. Other servos function to integrate angular motions according to control voltages produced by servos above referred to, for representation of the flight attitude as defined by roll, pitch and azimuth angles.

According to well known principles of aerodynamics, airspeed (V$_T$) is a function of engine thrust (T$h$) which is always positive (except for propeller drag when idling in flight below about 1200 R. P. M.), gravity (G) effect which may be either positive or negative depending on whether the aircraft is in a dive or climb attitude, and drag which is of course negative. Drag may be considered as a function of the airspeed (V$_T$), the altitude ($h$), and the angle of attack ($\alpha$).

Referring now to Fig. 1, it will be asumed that a plurality of A. C. voltages representing various values of "thrust," "drag" and "gravity" respectively according to the instantaneous polarity and magnitude of the respective voltages, are fed separately as indicated into a summing amplifier diagrammatically indicated at 20 included in the airspeed servo system designated V$_T$.

Such amplifiers are well known in the art for algebraically summing a plurality of separate A. C. voltages of varying magnitude and polarity and a detailed circuit illustration is therefore unnecessary. The output of the amplifier 20 is used to control an automatic balancing servo network including a motor-generator set 21 indicated as M-G. The circuit connections thereof are specifically shown only for the airspeed servo since the M-G operation is essentially the same for the other servos. The motor 30 is of the two-phase type, the control phase 31 of which is energized by the amplifier output as illustrated and the other phase 32 by a 90° dephased constant reference A. C. voltage +$e_1$. The operation of this type of motor is well known, the rotation being in one direction when the control and reference voltages in the respective phases have the same instantaneous polarity and in the opposite direction when the instantaneous polarity of the control voltage is reversed with respect to the reference voltage, the rate of rotation in both cases depending on the magnitude of the control voltage. The motor drives a two-phase feedback generator 33 also having one phase 34 energized by a 90° dephased A. C. reference voltage +$e_2$, the other phase 35 generating according to the motor speed a feed-back voltage E$_{fb}$ for purposes of rate control hereinafter described.

The feed-back voltage E$_{fb}$ in the air speed servo system represents $$\frac{dV_T}{dt}$$

i. e., acceleration, and is an input for the amplifier 20. The motor also serves to gang-operate through a gear reduction train 36 and suitable mechanical connections indicated by dotted lines 37 the contacts of a potentiometer system and also in certain servo systems an appropriate indicating instrument.

The individual potentiometer resistance elements, such as the units 40 to 47 inclusive of the airspeed servo system may be of the well-known wound card type and are of circular or band form in practice but are diagrammatically illustrated in a plane development for clearness. A structural arrangement that may be conveniently used for a servomotor and potentiometer combination of the character above referred to is shown by Patent No. 2,431,749, issued December 2, 1947, to R. B. Grant for Potentiometer Housing and Positioning Structure.

It will now be apparent that operation of the air speed servomotor in either direction causes the gang-operated potentiometer slider contacts 40', 41', 42' etc. to move to corresponding angular positions on the respective potentiometer elements for deriving, i. e., selecting or picking off, potentiometer voltages dependent on the respective contact position and on the voltage energizing the potentiometer. Each potentiometer of each servo system is shaped or contoured so that the value of the derived voltage at the potentiometer contact bears a certain relationship to the linear movement of the slider contact depending on the particular function of the potentiometer, and has a voltage impressed across its terminals depending as to instantaneous polarity and magnitude also on the function of the potentiometer. In the present case the contour of all functional potentiometers represents the derivative of the function represented. For example, the potentiometers of the air speed system are in general of the linear type to represent a relationship $x = y$, where $x$ represents the linear movement of the contact and $y$ represents the derived potentiometer voltage.

Stated more specifically, the contour or width variation and therefore the resistance distribution of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card is uniform, making it rectangular in shape.

In another case where a cosine function is involved, the derivative or slope of the cosine curve may be expressed as $$d\frac{(\cos \theta)}{d\theta} = \sin \theta$$

where $\theta$ is the angle measured in radians. Accordingly the contour of the potentiometer card for corresponding values of $\theta$ is sine shaped, the negative value being taken care of by corresponding selection of the polarity applied to the potentiometer. Conversely where a sine function is involved the potentiometer card for corresponding values of $\theta$ will have a cosine contour.

In view of the complexity of the interconnecting wiring of the servo systems, a simplified system will be used in order to avoid confusion and to expedite following the various circuits. Except where actual circuit connections are shown, the input and output terminals of the potentiometers, the input terminals of the respective servo and line amplifiers and associated equipment will be designated by both reference numbers and symbols indicating the corresponding terminals of other apparatus to which they are connected.

For convenience the potentiometers of each servo system are designated specially, for example the third potentiometer of the airspeed servo (V$_T$) as ③, the fifth potentiometer of the angle of attack servo ($\alpha$) as ⑤, etc. so that by identifying a servo system by its symbol and a potentiometer of that system by its number, the connections between potentiometers, servo systems, etc. can be readily traced.

Referring specifically to the airspeed servo system, the servo amplifier 20 is shown as energized by a plurality of voltage inputs, the first two (starting from the top) being from the servo system itself and represented feedback E$_{fb}$ from the servo generator 33 and thrust from V$_t$ potentiometer 42 respectively. The thrust potentiometer 42 is energized as shown at its lower terminal by a voltage representing brake horsepower B. H. P. that is in turn derived as previously indicated from the throttle potentiometer 5 controlled by the student. The throttle derived voltage may be modified by an R. P. M. potentiometer 38 that is also adjustable by the student to represent governor setting. An indicator MAP representing manifold pressure can be connected to the "throttle" control and an indicator TACH representing R. P. M. can be connected to the "governor" setting if desired.

The remaining inputs to the V$_T$ amplifier are from other parts of the computing system, input terminal 50 being energized from the corresponding terminal of Mach number potentiometer card #3, through card #2 of the $\alpha$ servo, by a voltage representing "drag," terminal 51 from card #3 of the pitch ($\theta$) servo by a voltage representing a "gravity" component and terminal 52 from card #5 of the $\alpha$ servo by a second gravity component voltage. The resultant of the various voltage inputs above described operates the servomotor 30 according to change in simulated airspeed, the motor being de-energized to represent a constant airspeed when the resultant of the various inputs during flight is zero representing a balance between thrust and drag, etc.

The eight potentiometers of the airspeed servo are used to derive function voltages according to airspeed for energizing indicating instruments, the V$_T$ line amplifier and other servo systems, it being noted that cards #2, #7 and #8 are in turn energized from other parts of the system. Specifically, card #1 is energized by a voltage +E and the slider contact 40' is operated according to change in airspeed for deriving a voltage representing true airspeed V$_T$ which is fed to a line amplifier 55 for producing, by means of a transformer 55' having a multiple secondary winding, oppositely phased voltages at terminals 56 and 57 representing —V$_T$ and +V$_T$. These voltages energize cosinusoidal card #1 of the $\theta$ servo, as well as other cards hereinafter described. The V$_T$ card #2 is energized at terminal 58 through a line amplifier 157, Fig. 3, from card #2 of the altitude ($h$) servo, by voltage representing air density times airspeed, and the derived voltage representing airspeed squared (V$^2$) from this card energizes, through the line amplifier 49 and terminal 59, the $\alpha$ card #2. Cards #3 and #4 are energized from the throttle and R. P. M. potentiometers above referred to by voltage representing brake horsepower, the derived voltage from card #3 being a thrust input to the V$_T$ servo and the derived voltage from card #4 energizing at terminal 60 the $h$ card #3, Fig. 3. The V$_T$ cards #5 and #6 are energized by voltages +E and —E respectively for deriving voltages representing the reciprocal of true airspeed for energizing the terminals of $\theta$ card #2. Card #7 is energized at terminal 61 from $h$ card #4 to derive a voltage representing the indicated airspeed and indicator 62 can be energized by this voltage to represent indicated air speed. The V$_T$ card #8 is energized at terminal 63 by a voltage from the side-slip (B) card #5, Fig. 2, for deriving a voltage representing side-slip and this voltage can be used for energizing an instrument 64 to simulate the ball indication of a ball-bank indicator.

Figure 2:
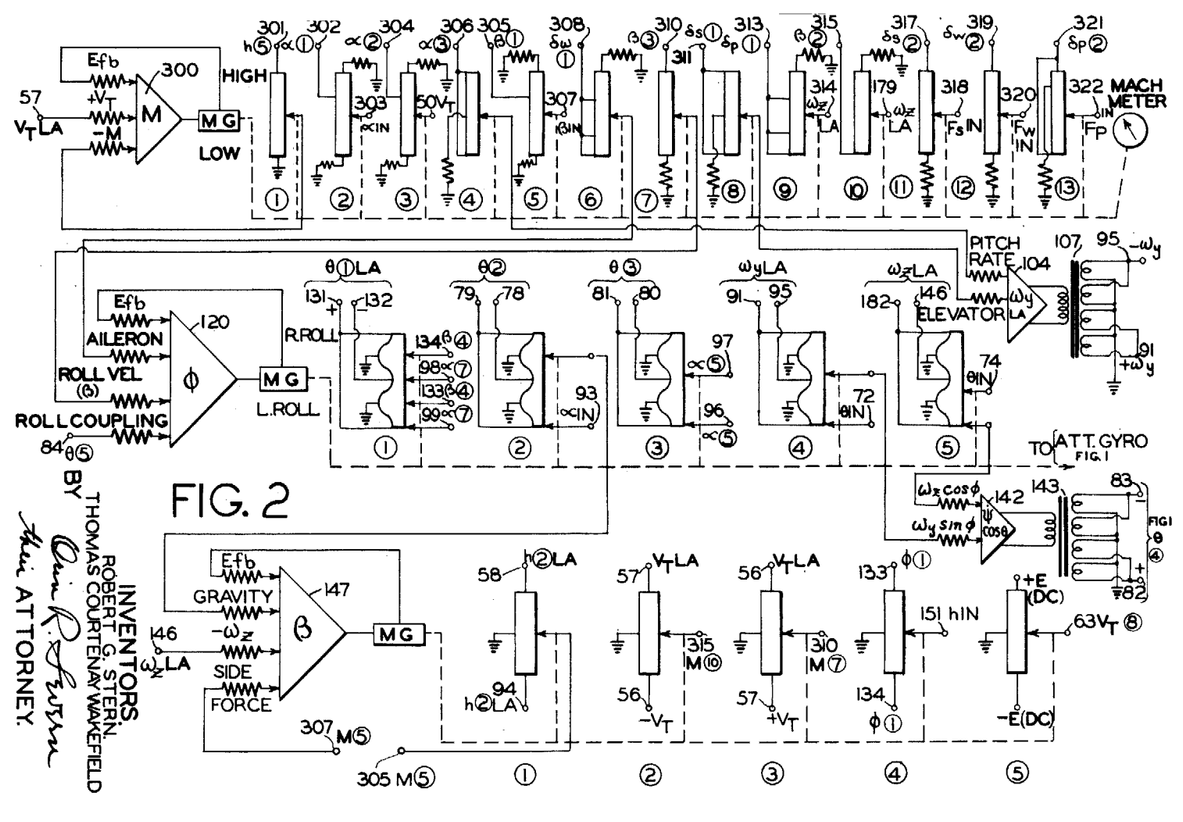
Fig. 2 is a similar illustration including the Mach number, roll and side slip servo systems.

The pitch ($\theta$) servo system, Fig. 1, includes a servo amplifier 71 and five potentiometer cards all of which, except card #4, are cosinusoidal in design. The inputs to the pitch servo during simulated flight comprise feedback $E_{fb}$ from the generator, a voltage at terminal 72 representing pitch rate in the vertical plane from the roll ($\phi$) card #4, Fig. 2, and a voltage at terminal 74 representing yaw rate in the vertical plane from roll card #5. Pitch card #1 is energized at its terminals according to $V_T$ for deriving a pair of voltages representing the resolution of $V_t$ for pitch. One of the derived voltages at terminal 76 is an input to both the $h$ servo amplifier and the rate of climb-dive $$\frac{(dh)}{(dt)}$$

servo amplifier and the other energizes a line amplifier 77 for producing positive and negative voltages at terminals 131 and 132 representing cosinusoidal values of $V_T$. Pitch card #2 is energized by positive and negative voltages representing the reciprocal of air speed $$\frac{1}{V_T}$$

these voltages coming from cards #5 and #6 of the $V_T$ servo. Four voltages are derived from pitch card #2, two of which at terminals 78 and 79 energize card #2 of the roll servo, the other two energizing $\alpha$ card #4 is shown. The card #3 is used for deriving a plurality of voltages according to cosinusoidal values of $\theta$, one voltage at terminal 51 being an input to the $V_T$ servo and the other two voltages at terminals 80 and 81 energizing $\phi$ card #3 for roll resolution. Card #4 which comprises separate sections for deriving secant functions is energized at terminals 82 and 83 from a corresponding line amplifier 142 presently described shown in Fig. 2. The derived voltages from card #4 in turn energize card #5 from which the derived voltage at terminal 84 representing "roll coupling" is fed to the input of the roll servo amplifier 120. One of the voltages derived from card #4 is also used as an input to the azimuth ($\psi$) servo amplifier 144 for positioning the indicator of a simulated compass 145.

The pitch servo also positions the pitch element of the simulated attitude gyro generally indicated at 89 for flight indication. The roll element of the gyro is positioned by the roll servo system presently described.

The angle of attack ($\alpha$) servo amplifier 90 is energized by a plurality of inputs, namely feed-back $E_{fb}$ from the generator, a voltage at terminal 91 from the amplifier 104 of the rate of pitch system, Fig. 2. Another input at terminal 93 is from card #2 of the $\phi$ servo representing a "gravity" component (Gr. 1), another gravity component (Gr. 2) coming from card #4 of the same servo. Finally an input voltage at terminal 303 representing "lift" is obtained from Mach number card #2, in turn energized from card #1 of the $\alpha$ servo, in turn energized from the line amplifier 157 connected to card #2 of the altitude servo, Fig. 3. The significance of this voltage will be discussed later.

Figure 3:
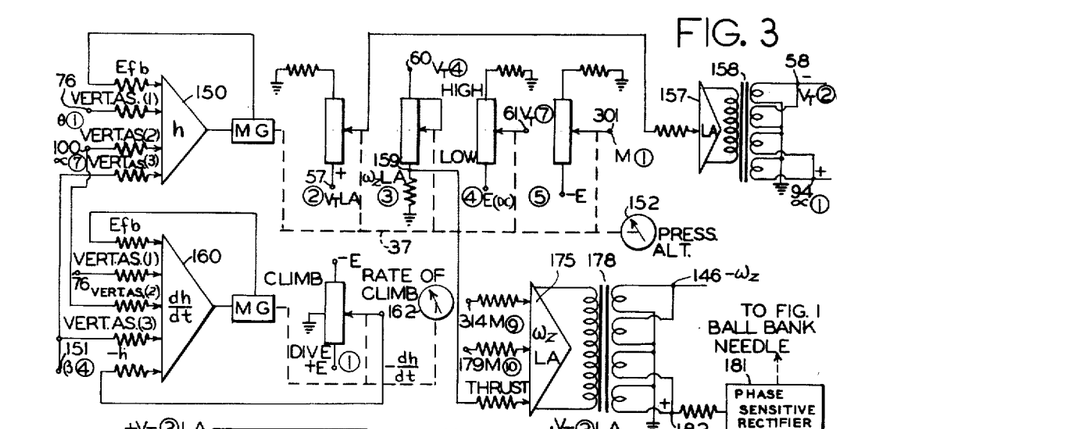
Fig. 3 is a similar illustration including the altitude and rate of climb servo systems.

The remaining cards of the $\alpha$ servo namely cards #2, #3, #5 and #7 are used for deriving voltages for other parts of the flight computing system. Card #2 is energized at terminal 59 from the $V_T$ card #2 for producing a "drag" voltage as modified by Mach number card #3 previously referred to for the $V_T$ servo input. Card #3 is energized at terminal 56 from line amplifier 55 according to airspeed for producing a voltage representing pitching rate due to angle of attack which in turn energizes at terminal 306 the Mach number card #4, Fig. 2; and the derived Mach number voltage in turn is fed to the rate of pitch amplifier 104. Card #5 is energized at terminal 96 from roll card #3, Fig. 2, for producing the aforesaid gravity component voltage for the input of the $V_T$ servo, and card #7 is energized at terminal 98 from roll card #1 for producing at terminal 100 a voltage representing a component of vertical airspeed. This component voltage is an input for the $h$ servo amplifier 150 and also for the $$\frac{dh}{dt}$$

amplifier 160, Fig. 3.

Referring to Fig. 2, the Mach number servo system which is adapted to modify derived voltages from the altitude, angle of attack, side slip and control force computing systems for in turn controlling other servo systems, comprises a servo amplifier 300 for controlling through its servo motor thirteen control potentiometers and a "Mach meter" as indicated. The computation of Mach number is performed according to the relationship between $V_T$ and ambient air temperature $$M = \frac{V_T}{f(t)}$$

as previously described, and since air temperature ($t$) can be expressed in terms of altitude $h$, the inputs for the Mach amplifier may represent $V_T = M.f(h)$. When the two parts of the equation (as represented by two oppositely phased voltages) are equal the amplifier output is zero and the servo is deenergized at a position representing the computed Mach number.

To this end, the inputs for the Mach servo comprise a feedback voltage $E_{fb}$, an airspeed voltage $V_T$ at terminal 57 and an answer voltage $-M$ from M card #1 representing $M.f(h)$. This card is energized at terminal 301 from $h$ card #5 and its derived voltage is opposite in phase to the $V_T$ voltage for balancing the servo. Thus calculation of Mach number is accomplished primarily according to the operation of the airspeed and altitude servos, in combination with Mach card #1.

Mach card #2 is energized at terminal 302 from $\alpha$ card #1 (in turn energized according to $h$ and $V_T$) for deriving at terminal 303 a modified "lift" voltage for the $\alpha$ servo. This card is concerned with "lift coefficient" ($C_L$) and alters the "lift" from the $\alpha$ card #1 by altering the slope of the curve $C_L$ vs. $\alpha$, increasing it up to a critical M and then decreasing it at higher Mach numbers. It will be seen that for the aircraft design herein represented by way of example, at about Mach number 0.8 the derived voltage from M card #2 is at its maximum for affecting the operation of the $\alpha$ servo and thereby simulating the effect of critical Mach number on angle of attack as in practice.

Mach card #3 is energized at terminal 304 from $\alpha$ card #2 (in turn energized according to $V_T$) for producing at terminal 50 the "drag" voltage previously referred to for controlling the $V_T$ servo. This card is concerned with "drag coefficient" ($C_D$) and alters "drag" in a similar manner to "lift" by altering the slope of the curve $C_D$ vs. $\alpha$, increasing it up to a critical M number and then decreasing it for higher Mach numbers.

M card #4 is energized at terminal 306 from $\alpha$ card #3 (in turn from $V_T$) for deriving a pitch rate voltage for $W_y$ amplifier 104. This card is concerned with "pitching moment coefficient" ($C_M$) and alters the slope of curve $C_M$ vs. $\alpha$, decreasing it in the vicinity of a critical Mach number.

M card #5 is energized at terminal 305 from B card #1 (in turn from $h$ and $V_T$) for deriving at terminal 307 a "side force" voltage for the B servo. This card is concerned with "side force coefficient" ($C_Y$) and alters the slope of curve $C_Y$ vs. B, increasing it up to a critical Mach number and then decreasing it for higher Mach numbers.

M card #6 is energized at terminal 308 from Fw card #1 (in turn from $V_T$) for deriving a "wheel" or aileron voltage for the roll servo. This card is concerned with "rolling moment coefficient" ($C_1$) and alters the slope of curve $C_1$ vs. $\delta_w$ (aileron deflection), decreasing it above a critical Mach number.

M card #7 is energized at terminal 310 from B card #3 (in turn from $V_T$) for deriving a "roll velocity" voltage for the roll servo. This card also relates to rolling moment coefficient and alters the slope of curve $C_1$ vs. $B$, increasing it above a critical Mach number.

M card #8 is energized at terminal 311 from the $F_s$ card #1 (in turn from $V_T$) for deriving a "stick" or elevator voltage for the pitch rate amplifier 104. This card also relates to "pitching moment coefficient" $C_M$ and alters the slope of curve $C_N$ vs. $\delta_p$ (rudder deflection), decreasing it in the vicinity of a critical Mach number.

M card #9 is energized at terminal 313 from the $F_p$ card #1 (in turn from $V_T$) for deriving a "pedal" or rudder voltage also for the pitch rate amplifier 104. This card concerns "yawing moment coefficient" ($C_N$) and alters the slope of curve $C_N$ vs. $\delta_p$ (rudder deflection), decreasing it with increase in Mach number.

M card #10 is energized at terminal 315 from the $B$ card #2 (in turn from $V_T$) for deriving at terminal 179 a yaw rate voltage. This card also concerns yawing moment coefficient and alters the slope of curve $C_N$ vs. $B$, decreasing it above a critical Mach number.

M card #11 is energized at terminal 317 from $F_s$ card #2 (in turn from $V_T$) for deriving at terminal 318 a force computing voltage for the $F_s$ or stick force servo, Fig. 5. This card concerns "stick force coefficient" ($F_s/q$) and alters the slope of curve $F_{s/q}$ vs. $\delta_s$, increasing it above a critical Mach number.

M card #12 is energized at terminal 319 from $F_w$ card #2 (in turn from $V_T$) for deriving at terminal 320 a force computing voltage for the $F_w$ or wheel force servo, Fig. 6. This card concerns "wheel force coefficient" ($F_w/q$) and alters the slope of curve $F_{w/q}$ vs. $\delta_w$, increasing it with increasing Mach number.

M card #13 is energized at terminal 321 from $F_p$ card #2 (in turn from $V_T$) for deriving at terminal 322 a force computing voltage for the $F_p$ or pedal force servo, Fig. 4. This card concerns "pedal force coefficient" ($F_p/q$) and alters the slope of curve $F_{p/q}$ vs. $\delta_p$, decreasing it in the vicinity of a critical Mach number.

Referring now to the rate of pitch system, the output of the $W_y$ line amplifier 104 energizes a transformer 107 having a multiple secondary winding for producing at terminals 91 and 95 voltages of opposite phase representing rate of pitch.

The roll ($\phi$) servo system operates the roll element of the attitude gyro 89, Fig. 1, and is used for resolving various control voltages according to roll attitude. The inputs for the $\phi$ servo amplifier 120 include a feedback voltage $E_{fb}$ from the generator, a voltage from M card #6 previously referred to, representing roll velocity due to aileron control operation, a voltage from M card #7 in turn derived from B card #3 representing roll velocity due to side slip, and a voltage from $\theta$ card #5 representing the above mentioned roll coupling at terminal 84.

The $\phi$ potentiometers which are cosinusoidal, are energized for deriving voltages as follows: card #1 is energized from the line amplifier 77 in turn energized from $\theta$ card #1, Fig. 1, for deriving four voltages, two of which at terminals 98 and 99 energize $\alpha$ card #7, and the other at terminals 134 and 133 two energize B card #4; card #2 is energized at terminals 78 and 79 from $\theta$ card #2 and two voltages are derived therefrom, the first being a gravity component input for B servo amplifier 147 and the second at terminal 93 being an input for the $\alpha$ servo amplifier, Fig. 1. Card #3 is energized at terminals 80 and 81 as previously stated from $\theta$ card #3 and the derived voltages at terminals 96 and 97 energize $\alpha$ card #5; card #4 is energized at terminals 91 and 95 according to rate of pitch as indicated for deriving two voltages, one of which is an input for the $$\frac{d\psi}{dt} \cos \theta \text{ line amplifier 142}$$

and the other an input for the $\theta$ servo amplifier at terminal 72; card #5 is energized at terminals 146 and 182 according to rate of yaw from the $W_z$ line amplifier 175, Fig. 3, for deriving at terminal 74 an input voltage for the $\theta$ amplifier and an input voltage as indicated for the aforesaid $$\frac{d\psi}{dt} \cos \theta \text{ amplifier 142}$$

It will be noted that variation in the simulated angular rates and forces such as gravity, lift, centrifugal force, thrust, drag, pitching velocity and the like are accomplished by the change in contact brush position on the respective potentiometers together with variation in the potentiometer energizing voltage, whereas the relative magnitude or effect of each of the aforesaid rates, forces and moments is determined by the value of the input resistance to the various amplifiers. As a specific example the relative magnitude of "lift" is affected by the values of air density ($P$), angle of attack ($\alpha$) and a constant factor proportional to wing area. These terms therefore determine the resistance value of the lift input indicated at the amplifier 90, Fig. 1. Lowering the value of the resistance increases the relative magnitude of the above constant.

The use of the feed-back generators for rate control is particularly important, the pitch servo integrating system serving as an example. If the servomotor alone were relied upon to perform the pitch integrating operation the natural inertia of the driving mechanism would introduce such a large error that from a practical standpoint the system would not be useful. However, with the feed-back generator connected in the system, the generated feed-back voltage $E_{fb}$ constitutes an input for the pitch amplifier and is of such phase relation to the summed or resultant input signal that it opposes the same, i. e. in the manner of degenerative or negative feedback. With large gain in the control amplifier the speed of the motor is therefore caused according to well known principles to have a linear speed response to the magnitude of the input signal, i. e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

Referring again to Fig. 2, the rate of azimuth change $$\frac{(d\psi)}{(dt)}$$

or $\dot{\psi}$ is determined by resolving respectively the rate of pitch ($W_y$) and rate of yaw ($W_z$) for roll angle ($\phi$) and pitch angle ($\theta$). For this purpose line amplifier 142, Fig. 2 is energized from $\phi$ cards #4 and #5 above referred to and produces by means of transformer 143 at terminals 82 and 83 a pair of oppositely phased control voltages for controlling simulated compass indication, Fig. 1, as previously described. The $\psi$ amplifier input voltage ($W_y \sin \phi$) derived from $\phi$ card #4 represents yaw rate resolved into a plane that is inclined to the vertical by an angle $\theta$, and the input voltage ($W_z \cos \phi$) derived from $\phi$ card #5 represents pitch rate resolved into the same plane. The voltages obtained at the output terminals 82 and 83 of this line amplifier then represent the function $$\frac{d\psi}{dt} \cos \cdot \theta$$

These control voltages, as previously indicated, energize card #4 of the pitch system, Fig. 1, which in turn produces voltages representing rate of azimuth change $$\frac{d\psi}{dt}$$

Accordingly, the ψ servo amplifier 144, Fig. 1 is energized by one of the $$\frac{d\psi}{dt}$$

voltages for positioning the compass indicator 145.

The side-slip (B) servo system comprises a servo amplifier 147 having the following input voltages: a feedback voltage E$_{rb}$ from the generator, a voltage from φ card #2 representing a gravity component, a yaw rate voltage at terminal 146 from the W$_z$ line amplifier, Fig. 3, and a voltage at terminal 307 from the B card #1, as modified by Mach number card #5, representing a side force. Card #1 is energized at terminal 58 by a voltage from the altitude line amplifier 157, Fig. 3, and the derived voltage at terminal 305 in turn energized Mach card #5 for deriving the aforesaid side force voltage. The side-slip card #2 is energized at terminal 57 from the V$_T$ line amplifier 55, Fig. 1, according to air speed and the derived voltage at terminal 315 energizes Mach card #10 for in turn deriving at terminal 179 an input voltage representing yawing velocity due to sideslip for the W$_z$ line amplifier 175; B card #3 is energized at terminal 56 by an oppositely phased voltage from the V$_T$ line amplifier 55 and the derived voltage at terminal 310 energizes Mach number card #7 for in turn deriving an input voltage representing roll velocity for the φ servo amplifier 120; card #4 is energized at terminal 133 from φ card #1 for deriving at terminal 151 an input voltage representing a component of vertical air speed for the altitude servo amplifier 150 and also the vertical air speed or rate of climb $$\frac{dh}{dt}$$

servo amplifier 160, Fig. 3; and card #5 is energized by a constant D. C. voltage for deriving a voltage at terminal 63 representing sideslip for energizing V$_T$ card #8, Fig. 1, the derived voltage from which energizes the indicator 64 representing the "ball" of the simulated ball-bank indicator.

Referring to Fig. 3, the altitude h servo amplifier 150 is shown as having the following voltage inputs; a feedback voltage E$_{rb}$ from the generator and three other voltages representing components of vertical air speed, namely a voltage at terminal 76 from θ card #1, a second voltage at terminal 100 from α card #7, and a third voltage at terminal 151 from B card #4. The resultant output of the servo amplifier 150 controls the servo motor in the manner previously described to operate both the potentiometer contacts and an indicator 152 representing a pressure altimeter.

The potentiometers of the h integrating servo system function as follows: card #2 is energized at terminal 57 according to air speed from the V$_T$ line amplifier for deriving a voltage representing the effect of altitude on indicated airspeed. This voltage is transformed by the line amplifier 157 and transformer 158 into a pair of oppositely phased control voltages at terminals 58 and 94 that are used as inputs as previously described for cards of the V$_T$ and α systems; card #3 is energized at terminal 60 from the V$_T$ card #4 by a thrust voltage for deriving an input voltage for the W$_z$ line amplifier 175 which affects yaw rate according to engine thrust; card #4 is energized by a constant D. C. voltage for deriving at terminal 61 an energizing voltage for V$_T$ card #7, Fig. 1 which in turn energizes a D. C. indicator 62 representing an air speed meter; and card #5 is energized by a constant voltage for deriving at terminal 301 an energizing voltage for Mach card #1 for supplying the answer voltage to the Mach servo. Thus, the air speed reading is corrected for variation in altitude by card #4 and the Mach number answer voltage is modified for variation in altitude by card #5.

The rate of climb-dive $$\frac{(dh)}{dt}$$

or vertical airspeed servo system comprises a servo amplifier 160 for controlling through its servo an answer potentiometer #1 according to vertical airspeed and for positioning an indicator 162 for representing rate of climb or vertical airspeed. The inputs for the amplifier 160 include a feedback voltage E$_{rb}$ from the generator, three voltages representing components of vertical air speed, and an answer voltage —h representing vertical air speed from card #1. The three voltages representing components of vertical air speed are the same as those constituting inputs for the altitude servo above described.

The rate of yaw (W$_z$) line amplifier 175 is for producing a pair of oppositely phased voltages, representing yaw rate. The amplifier inputs include a rudder control or turning rate voltage at terminal 314 that is derived jointly from the pedal force (F$_p$) servo card #1 and the Mach card #9. The F$_p$ card is energized at terminal 57 by an airspeed voltage V$_T$. A side-slip voltage from B card #2, which is energized according to airspeed, is modified by Mach card #10 and the derived voltage at terminal 179 constitutes another input for the yaw rate amplifier, and finally a thrust voltage from h card #3 completes the inputs.

The resultant output of the W$_z$ line amplifier 175 energizes a transformer 178, the secondary of which produces at terminals 146 and 182 oppositely phased voltages representing rate of yaw which are used for other parts of the system as indicated. The voltage at terminal 182 energizes a phase sensitive rectifier 181 for operating the turn needle of the simulated ball bank indicator 64, Fig. 1. As previously explained, the "ball" of this indicator is operated from the V$_T$ system by a voltage representing components of side-slip and air speed.

Figs. 4, 5 and 6 illustrate the simulated rudder, elevator and aileron controls, together with the associated control potentiometers and force computing amplifiers and servo units. The force computing amplifier of a respective unit controls a servo torque motor which is mechanically connected through a reduction gear box to the associated control member so as to apply an opposing force to the control in simulation of aerodynamic control loading during flight. Simulated trim control is also introduced for determining the neutral position of the control member as in practice.

Referring to Fig. 4, the rudder control pedal 325 is connected as indicated to F$_p$ cards #1 and #2, which as previously described function to derive voltages at the terminals 313 and 321 for determining, through the Mach servo system, rate of yaw and rudder control loading respectively. These cards are energized at opposite terminals by oppositely phased V$_T$ voltages and have grounded center taps to represent aircraft turning from a neutral position, i. e. aircraft nose right (ANR) and aircraft nose left (ANL). The rudder pedal is also mechanically connected to the F$_p$ servomotor which is energized from the force computing amplifier 328. This amplifier has the following inputs; a feedback voltage E$_{rb}$, a trim voltage derived from potentiometer 332 according to adjustment of the "rudder trim wheel" 331, and a rudder force voltage at terminal 322 as modified according to Mach number, from F$_p$ card #2. The resultant output voltage energizes the servomotor in a direction tending to restore the rudder pedal to its neutral or trimmed position in simulation of aerodynamic loading of the rudder control surface, and to position the cards #1 and #2 accordingly. Thus the control loading is a function of rudder pedal displacement δ$_p$, airspeed V$_T$ and Mach number.

Fig. 5 shows the elevator control or stick 326 connected as indicated to the F$_s$ cards #1 and #2, which as previously described function to derive voltages at terminals 311 and 317 for determining, through the Mach servo, the rate of pitch and the stick loading force respectively. These cards are also energized at the terminals by oppositely phased $V_T$ voltages and have grounded center taps to represent aircraft pitch attitude from a level position, i. e. aircraft nose up (ANU) and aircraft nose down (AND). The stick is also mechanically connected to the $F_s$ servomotor which is energized from the stick force computing amplifier 329. This amplifier has the following inputs; a feedback voltage $E_{fb}$, a trim voltage derived from potentiometer 334 according to adjustment of the "elevator trim wheel" at 333, and a stick force voltage at terminal 318 as modified according to Mach number, from the $F_s$ card #2. The resultant output voltage from the amplifier energizes the servomotor in a direction tending to restore the stick to its neutral or trimmed position in simulation of aerodynamic loading of the elevator control surface, and to position the cards #1 and #2 accordingly. Elevator control loading is thus a function of stick displacement $\delta_s$, airspeed and Mach number.

Referring to Fig. 6, the aileron control or wheel 327 is connected as indicated to the $F_w$ cards #1 and #2 which as previously described function to derive voltages at terminals 308 and 319 for determining, through the M servo system a roll factor and aileron loading respectively. These cards are energized according to airspeed and have grounded center taps to represent aircraft roll or bank from level position, i. e. right wing up (RWU) and left wing up (LWU). The wheel is also mechanically connected to the $F_w$ servomotor which is energized from the force computing amplifier 330. This amplifier has the following inputs; a feedback voltage $E_{fb}$, a trim voltage derived from potentiometer 336 according to adjustment of the "aileron trim wheel" 335, and a force voltage at terminal 320 as modified according to Mach number, from $F_w$ card #2. The resultant output voltage energizes the servomotor in a direction tending to restore the wheel to its neutral or trimmed position in simulation of aerodynamic loading of the aileron control surfaces and to position the cards #1 and #2 accordingly. As before, the control loading is a function of wheel displacement $\delta_w$, airspeed and Mach number.

The essential elements of a simulated flight computing system including compensation for Mach number are described above and a detailed description of the operation thereof for various aerobatic maneuvers such as banking, rolls, loops, etc., is unnecessary for an understanding of the present invention. It is sufficient to state that changes in the primary input voltages from the pilot-controlled throttle, aileron, elevator and rudder potentiometers affect the balance of the air speed, roll, rate of pitch and rate of yaw systems respectively, which in turn react with other servo systems, such as the Mach number, angle of attack, pitch, altitude and side-slip systems for causing said systems to move or operate towards new positions of balance to simulate actual flight. There is a continuous interaction between the servo systems including the Mach number servo system which is controlled primarily according to airspeed $V_T$ and in turn modifies the operation of the $V_T$ system, either directly as by Mach card #3 or indirectly through other servo systems.

For example, a simulated increase in air speed due to increased brake horsepower as represented by a more positive voltage at the $V_T$ input from the throttle potentiometer 5 causes the air speed servo to seek a new position of balance toward higher speed indication with the result that the potentiometer contacts of the $V_T$ system all move upward. In the case of card #1, the derived $V_T$ voltage is increased and since this voltage energizes card #1 of the $\theta$ system, the derived voltage in turn from this $\theta$ card, which is an input for both the altitude and rate of climb servos is increased accordingly so that where $\theta$ is greater or less than zero corresponding changes in altitude and vertical speed are indicated. At the same time the "drag" input for the $V_T$ servo from the $V_T$ and $\alpha$ systems is modified by Mach card #3 so that $V_T$ tends to reflect these factors as well. The derived airspeed-squared voltage from $V_T$ card #2 affects card #2 of the angle of attack servo so that the drag voltage tends to increase due to the increased air speed. Also this $V_T$ voltage is used for computing the pedal control force through $F_P$ card #2, Mach card #13 and the $F_P$ servo amplifier which in turn energizes the servomotor for developing the simulated control resistance.

The thrust voltages from $V_T$ cards #3 and #4 have been previously considered, the first of which tends to increase air speed due to increased brake horsepower and the second, which is modified by the $h$ servo, to affect rate of yaw. The voltages from $V_T$ cards #5 and #6 which represent gravity factors are modified by pitch card #2 and also in part by angle of attack card #4 for producing a gravity input for the angle of attack servo. Other derived voltages from $\theta$ card #2 are modified by the roll card #2 for representing additional gravity components for the B and $\alpha$ servos. The function of cards #7 and #8 has been previously described for operating simulated flight indicating instruments. The $V_T$ servo system reaches its new position of balance when the increased "drag" voltage from the $\alpha$ servo, and also the changed gravity component voltages counterbalance the increased "thrust" voltage, thereby de-energizing the $V_T$ servo at the new air speed for representing a steady-state condition which normally is of short duration due to continuously varying simulated flight conditions.

It should be understood that this invention is not limited to specific details of construction and arrangement thereof herein illustrated, and that changes and modifications may occur to one skilled in the art without departing from the spirit of the invention.

What is claimed is:

1. Flight simulating apparatus for representing flight conditions of high speed aircraft comprising simulated aircraft controls, a flight computing system responsive to said controls including a plurality of interconnected and interdependent electrical systems each representing a respective flight condition including airspeed and altitude, said airspeed and altitude systems adapted respectively to produce signals representing functions of simulated airspeed and ambient air temperature, and an electrical computing system jointly responsive to said airspeed and temperature function signals for representing Mach number, said Mach number system in turn having signal deriving means operatively connected to other of said flight condition systems for effecting continuous modification of the operation thereof according to change in simulated Mach number, and indicating means controlled by said Mach number system for representing a Mach meter.

2. Flight simulating apparatus for representing flight conditions of high speed aircraft comprising simulated aircraft controls, a flight computing system responsive to said controls including a plurality of interconnected and interdependent electrical systems each representing a respective flight condition including airspeed and altitude, said airspeed and altitude systems adapted respectively to produce voltages representing functions of simulated airspeed and ambient air temperature, and an electrical computing system jointly responsive to said airspeed and temperature function voltages for representing Mach number, said Mach number system in turn having voltage deriving means operatively connected to other of said flight condition systems for effecting continuous modification of the operation thereof according to change in simulated Mach number, and indicating means controlled by said Mach number system for representing a Mach meter.

3. Flight simulating apparatus for representing flight conditions of high speed aircraft comprising simulated aircraft controls, a flight computing system responsive to said controls including a plurality of interconnected and interdependent electrical systems each representing a respective flight condition including airspeed, angle of attack, rate of pitch, side slip and altitude, said airspeed and altitude systems adapted respectively to produce voltages representing functions of simulated airspeed and ambient air temperature, and an electrical computing system jointly responsive to said airspeed and temperature function voltages for representing Mach number, said Mach number system in turn having voltage deriving means operatively connected to the flight condition systems including angle of attack, airspeed, rate of pitch and side slip for continuously modifying the operation thereof according to change in simulated Mach number, and indicating means controlled by said Mach number system for representing a Mach meter.

4. Flight simulating apparatus for representing flight conditions of high speed aircraft comprising simulated aircraft controls, a flight computing system responsive to said controls including a plurality of interconnected and interacting servo units each representing a flight condition including airspeed, angle of attack and altitude, and an electro-mechanical computing servo mechanism jointly responsive to the servo units representing airspeed and altitude for representing Mach number, said Mach number servo including voltage deriving means operatively connected to said angle of attack servo unit for materially modifying the operation thereof during continuous operation according to critical change in simulated Mach number, and indicating means controlled by said Mach number servo unit for representing a Mach meter.

5. Flight simulating apparatus for representing flight conditions of high speed aircraft comprising simulated aircraft controls, a flight computing system responsive to said controls including a plurality of interconnected and interacting electrical servo units each representing a flight condition including airspeed, angle of attack, sideslip, and altitude, and an electro-mechanical computing servo mechanism jointly responsive to the servo units representing air speed and altitude for representing Mach number, said Mach number servo including voltage deriving means operatively connected to other of said servo units representing angle of attack and sideslip respectively for materially modifying the operation thereof during continuous operation according to critical change in simulated Mach number, and indicating means controlled by said Mach number servo unit for representing a Mach meter.

6. Flight simulating apparatus for representing flight conditions of high speed aircraft comprising simulated aircraft controls, a flight computing system responsive to said controls including a plurality of interconnected and interacting servo-potentiometer units each representing a flight condition, certain of said units adapted to produce control voltages representing functions of airspeed and ambient air temperature, and an electro-mechanical servo-potentiometer unit jointly responsive to said control voltages for representing Mach number, said Mach number servo having a plurality of potentiometers electrically connected to other of said flight condition servo units including units representing angle of attack and sideslip for modifying the operation thereof according to critical change in simulated Mach number, and indicating means controlled by said Mach number servo unit for representing a Mach meter.

7. Flight simulating apparatus for representing flight conditions of high speed aircraft comprising simulated aircraft controls, a flight computing system responsive to said controls including a plurality of interconnected and interacting electrical servo units each representing a flight condition including airspeed, angle of attack and altitude, said airspeed and altitude servo units adapted to derive voltages representing functions of airspeed and air temperature respectively and an electro-mechanical servo mechanism jointly responsive to said function voltages for representing Mach number, said Mach number servo having voltage deriving means for modifying said temperature function voltage for in turn controlling said Mach servo and also having other voltage deriving means connected to said angle of attack servo unit for modifying the operation thereof during continuous operation according to change in simulated Mach number, and indicating means controlled by said Mach number servo and by respective servo units for representing flight instruments.

8. Flight simulating apparatus for representing flight conditions of high speed aircraft comprising simulated aircraft controls, a flight computing system responsive to said controls including a plurality of interconnected and interacting electrical servo units each representing a flight condition including airspeed, angle of attack, sideslip, and altitude, said units each having voltage deriving means for producing control voltages for the system servos, and an electro-mechanical servo mechanism jointly responsive to control voltages from the servo units representing functions of airspeed and altitude for representing Mach number, said Mach number servo having voltage deriving means for modifying control voltages from said angle of attack and sideslip servos respectively for in turn modifying the operation of said system servos during continuous operation according to change in simulated Mach number, and indicating means controlled by said Mach number servo and by respective servo units for representing flight instruments including Mach meter.

9. Flight simulating apparatus for representing flight conditions of high speed aircraft comprising simulated aircraft controls, a flight computing system responsive to said controls including a plurality of interconnected and interacting electrical servo-potentiometer units each representing a flight condition, said units adapted to produce control voltages including voltages representing functions of airspeed and ambient air temperature, and an electro-mechanical servo-potentiometer unit jointly responsive to said function control voltages for representing Mach number, said Mach number servo having a plurality of potentiometers for modifying control voltages from servo units including the units representing angle of attack, altitude and sideslip for in turn modifying the operation of all the system servos including the Mach number servo according to change in simulated Mach number, and indicating means controlled by said Mach number servo and by respective servo units for representing flight instruments including Mach meter.

10. Flight simulating apparatus for representing flight conditions of high speed aircraft comprising simulated aileron, elevator and rudder controls, voltage deriving means responsive to the operation of said controls, a flight computing system responsive to control voltages from said deriving means, said computing system including a plurality of interconnected and interacting electrical servo units each having voltage deriving means, two of said servo units representing functions of airspeed and air temperature, an electrical servo mechanism having voltage deriving means and jointly responsive to derived voltages from said airspeed and temperature units for representing Mach number, and a servo-motor for each of said simulated controls responsive jointly to the voltage deriving means of said airspeed and Mach number servos and to the operation of the respective control for opposing the movement of said control from neutral in simulation of control loading.

11. Flight simulating apparatus for representing flight conditions of high speed aircraft comprising simulated aileron, elevator and rudder controls, voltage deriving means responsive to the operation of said controls, a flight computing system responsive to control voltages from said deriving means, said computing system including a plurality of interconnected and interacting electrical servo units each having voltage deriving means, said servo units producing voltages representing functions of airspeed and air temperature and an electrical servo mechanism jointly responsive to said airspeed and temperature voltages for representing Mach number, and a servomotor connected to each of said simulated controls and responsive to an airspeed voltage as modified by the joint operation of both the respective control and said Mach servo for opposing the movement of said control from neutral in simulation of control loading.

12. Flight simulating apparatus for representing flight conditions of high speed aircraft comprising simulated aileron, elevator and rudder controls, control voltage deriving means energized by voltages representing functions of airspeed and responsive to the operation of said controls, a flight computing system responsive to control voltages from said deriving means, said computing system including a plurality of interconnected and interacting electrical servo units each having voltage deriving means, said servo units producing voltages representing functions of airspeed and air temperature and an electrical servo mechanism having voltage deriving means energized from said control voltage deriving means, said servo jointly responsive to said airspeed and temperature voltages for representing Mach number, and a servomotor connected to each of said simulated controls and responsive to voltage from said Mach number deriving means for opposing the movement of said control from neutral in simulation of control loading.

13. Flight simulating apparatus for representing flight conditions of high speed aircraft comprising simulated aileron, elevator and rudder controls, control potentiometers responsive to the operation of said controls, a flight computing system responsive to control voltages from said control potentiometers, said computing system including a plurality of interconnected and interacting electrical servo units each having potentiometers, two of said servo units adapted to produce potentiometer voltages representing functions of airspeed and air temperature, said control potentiometers being energized by airspeed voltages, and an electrical servo mechanism having potentiometers energized from said control potentiometers respectively, said servo jointly responsive to airspeed and temperature voltages for representing Mach number, and a servomotor connected to each of said simulated controls responsive to a voltage from one of said Mach number potentiometers for opposing the movement of said control from neutral in simulation of control loading.

14. Flight simulating apparatus for representing flight conditions of high speed aircraft comprising simulated aileron, elevator and rudder controls, voltage deriving means responsive to the operation of said controls, a flight computing system responsive to control voltages from said deriving means, said computing system including a plurality of interconnected and interacting electrical servo units each having voltage deriving means and an electrical servo mechanism jointly responsive to derived voltages representing functions of air speed and air temperature from said servo units for representing Mach number, a simulated trim control and related voltage deriving means for each control, and a servomotor connected to each of said simulated controls and responsive jointly to a trim control voltage and said airspeed voltage as modified by the joint operation of the respective control and said Mach servo for opposing the movement of said control from neutral in simulation of control loading.

15. Flight simulating apparatus for representing flight conditions of high speed aircraft comprising simulated aileron, elevator and rudder controls, voltage deriving means responsive to the operation of said controls, a flight computing system responsive to control voltages from said deriving means, said computing system including a plurality of inter-acting electrical systems, two of said electrical systems representing functions of airspeed and air temperature respectively and adapted to produce voltages corresponding to said functions, an electrical servo mechanism having voltage deriving means and jointly responsive to the aforesaid airspeed and temperature function voltages for representing Mach number, and motive means operatively connected to each of said simulated controls responsive jointly to airspeed function voltages, derived voltages from said Mach number servo and the operation of the respective control for opposing the movement of said control from neutral in simulation of control loading.

16. Flight simulating apparatus for representing flight conditions of high speed aircraft comprising simulated aileron, elevator and rudder controls, voltage deriving means responsive to the operation of said controls, a flight computing system responsive to control voltages from said deriving means, said computing system including a plurality of inter-acting electrical systems, two of said electrical systems representing functions of airspeed and air temperature respectively and adapted to produce voltages corresponding to said functions, an electrical servo mechanism jointly responsive to the aforesaid airspeed and temperature function voltages for representing Mach number, said servo mechanism including voltage deriving means adjustable according to Mach number and energized by flight function voltages including airspeed function voltages from said computing system for in turn deriving control voltages, and motive means operatively connected to each of said simulated controls responsive jointly to airspeed function voltages, derived control voltages from said Mach number servo and the operation of the respective control for opposing the movement of said control from neutral in simulation of control loading.

17. Flight simulating apparatus for representing flight conditions of high speed aircraft comprising simulated aileron, elevator and rudder controls, voltage deriving means responsive to the operation of said controls, a flight computing system responsive to control voltages from said deriving means, said computing system including a plurality of inter-acting electrical systems, two of said electrical systems representing functions of airspeed and air temperature respectively and adapted to produce voltages corresponding to said functions, an electrical servo mechanism jointly responsive to the aforesaid airspeed and temperature function voltages for representing Mach number, and motive means including voltage deriving means energized by airspeed function voltages for deriving loading voltages and operatively connected to each of said simulated controls, said servo mechanism including voltage deriving means adjustable according to Mach number and energized by flight function voltages including said loading voltages, said motive means being responsive to a derived voltage from the Mach number deriving means energized by said loading voltage for opposing the movement of said control from neutral in simulation of control loading.

18. Flight simulating apparatus for representing flight conditions of high speed aircraft comprising simulated aircraft controls, a flight computing system responsive to said controls including a plurality of inter-acting electrical systems each representing a flight condition, four of said systems representing functions of airspeed, angle-of-attack, side-slip and altitude respectively and adapted to produce respective voltages corresponding to said functions, an electrical servo-potentiometer mechanism energized according to airspeed and altitude function voltages for representing Mach number, said Mach number servo including a plurality of potentiometers adjustable according to Mach number and adapted to be energized by aforesaid voltages representing functions of airspeed, angle-of-attack and side-slip for in turn producing according to the operation of said Mach number servo control voltages for modifying the operation of aforesaid inter-acting systems of said flight computing system, and indicating means controlled by said Mach number servo and by respective flight condition systems for representing flight instruments.

19. Flight simulating apparatus for representing flight conditions of high speed aircraft comprising simulated aircraft controls, a flight computing system responsive to said controls including a plurality of inter-acting electrical systems each representing a flight condition, including angle-of-attack, true air speed, rate-of-pitch, rate-of-yaw, side-slip, roll and altitude, four of said systems representing functions of airspeed, angle-of-attack, side-slip and altitude respectively adapted to produce respective voltages corresponding to said functions, an electrical servo-potentiometer mechanism energized according to airspeed and altitude function voltages for representing Mach number, said Mach number servo including a plurality of potentiometers adapted to be energized by aforesaid voltages representing functions of airspeed, angle-of-attack, side-slip and altitude for in turn producing according to the operation of said Mach number servo control voltages for modifying the operation of aforesaid inter-acting systems of said flight computing system, including angle-of-attack, true air speed, rate-of-pitch, side-slip, roll and rate-of-yaw, and indicating means controlled by said Mach number servo and by certain flight condition systems for representing flight instruments.

References Cited in the file of this patent

UNITED STATES PATENTS

| | | |
|---|---|---|
| 2,554,155 | Rippere | May 22, 1951 |
| 2,556,964 | Giroud | June 12, 1951 |
| 2,628,434 | Dehmel | Feb. 17, 1953 |

OTHER REFERENCES

Aviation, pages 128, 129; September 1944.

Aero Digest, pages 36, 37, 99 and 100, February 1950.

UNITED STATES PATENT OFFICE
Certificate of Correction

Patent No. 2,784,501                                March 12, 1957

Robert G. Stern et al.

It is hereby certified that error appears in the printed specification of the above numbered patent requiring correction and that the said Letters Patent should read as corrected below.

Column 9, line 7, for "$C_N$ vs. $\delta_p$ (rudder deflection)" read —$C_M$ vs. $\delta_s$ (elevator deflection)—; column 10, line 58, for "The $\psi$ amplifier" read —The $\dot{\psi}$ amplifier—; column 13, line 52, for "elevaor" read —elevator—.

Signed and sealed this 20th day of August 1957.

[SEAL]

Attest:
KARL H. AXLINE,
*Attesting Officer.*

ROBERT C. WATSON,
*Commissioner of Patents.*